(12) United States Patent
Kim et al.

(10) Patent No.: US 11,907,897 B2
(45) Date of Patent: Feb. 20, 2024

(54) TRANSPORTATION DATA LOGGING DEVICE AND ITEM TRANSPORTATION SYSTEM INCLUDING THE SAME

(71) Applicant: AMOSENSE CO., LTD., Cheonan-si (KR)

(72) Inventors: Beom Jin Kim, Bucheon-si (KR); Hyung Il Baek, Yongin-si (KR)

(73) Assignee: Amosense Co., Ltd., Cheonan-si (KR)

( * ) Notice: Subject to any disclaimer, the term of this patent is extended or adjusted under 35 U.S.C. 154(b) by 431 days.

(21) Appl. No.: 16/647,104

(22) PCT Filed: Sep. 19, 2018

(86) PCT No.: PCT/KR2018/011038
§ 371 (c)(1),
(2) Date: Mar. 13, 2020

(87) PCT Pub. No.: WO2019/066364
PCT Pub. Date: Apr. 4, 2019

(65) Prior Publication Data
US 2020/0210952 A1 Jul. 2, 2020

(30) Foreign Application Priority Data
Sep. 28, 2017 (KR) .................. 10-2017-0126051

(51) Int. Cl.
*G06Q 10/08* (2023.01)
*G06K 7/10* (2006.01)
*G06Q 10/083* (2023.01)

(52) U.S. Cl.
CPC ..... *G06Q 10/0838* (2013.01); *G06K 7/10297* (2013.01)

(58) Field of Classification Search
CPC ................. G06Q 10/0838; G06K 7/10297
See application file for complete search history.

(56) References Cited

U.S. PATENT DOCUMENTS 5,313,439 A * 5/1994 Albeck ................ G04B 37/127
368/10
5,528,228 A * 6/1996 Wilk ...................... G08B 21/18
340/584

(Continued)

FOREIGN PATENT DOCUMENTS

KR 20100134574 A 12/2010
KR 101038415 B1 6/2011
(Continued)

*Primary Examiner* — Mohamed Charioui
*Assistant Examiner* — Lynda Dinh
(74) *Attorney, Agent, or Firm* — Rothwell, Figg, Ernst & Manbeck, P.C.

(57) ABSTRACT

A transportation data logging device including one or more of: a sensing unit configured to sense at least one of internal state information of the accommodating body and external event information of the accommodating body; a memory unit configured to store information acquired through the sensing unit; a communication unit configured to transmit the information stored in the memory unit to an external electric device; a control unit configured to control operation of the sensing unit, the memory unit and the communication unit; and a power supply unit configured to supply power to the control unit.

5 Claims, 3 Drawing Sheets

(56) References Cited

U.S. PATENT DOCUMENTS

| | | | | |
|---|---|---|---|---|
| 6,664,887 B1* | 12/2003 | Fuchs | ............... | B65D 81/24 |
| | | | | 340/815.69 |
| 6,995,669 B2* | 2/2006 | Morales | ........... | G06K 19/07798 |
| | | | | 340/539.31 |
| 7,124,881 B2* | 10/2006 | Fee | ............... | G06Q 10/0875 |
| | | | | 283/81 |
| 7,450,007 B2* | 11/2008 | Cook | ............ | G06K 19/07749 |
| | | | | 340/568.1 |
| 7,592,916 B2* | 9/2009 | Staples | ............... | G06Q 10/08 |
| | | | | 700/229 |
| 7,630,864 B2* | 12/2009 | Shoenfeld | ............... | E05B 65/52 |
| | | | | 702/182 |
| 8,398,727 B2* | 3/2013 | Lee | ............... | H01M 6/181 |
| | | | | 29/623.2 |
| 8,749,377 B2* | 6/2014 | Lane | ............... | G05B 23/0272 |
| | | | | 340/540 |
| 9,614,592 B2* | 4/2017 | Yang | ............... | H01Q 7/00 |
| 2005/0037163 A1* | 2/2005 | Wu | ............... | B65B 9/042 |
| | | | | 428/34.2 |
| 2006/0181961 A1* | 8/2006 | Hobkirk | ............... | G04B 47/02 |
| | | | | 368/10 |
| 2006/0208881 A1* | 9/2006 | Suzuki | ............... | A01N 1/02 |
| | | | | 340/539.27 |
| 2012/0235792 A1 | 9/2012 | Huang | | |

FOREIGN PATENT DOCUMENTS

| | | |
|---|---|---|
| KR | 101257406 B1 | 4/2013 |
| KR | 101521633 B1 | 5/2015 |
| KR | 20150093154 A | 8/2015 |
| KR | 101630199 B1 | 6/2016 |
| KR | 20170020155 A | 2/2017 |

* cited by examiner

TRANSPORTATION DATA LOGGING DEVICE AND ITEM TRANSPORTATION SYSTEM INCLUDING THE SAME

CROSS REFERENCE TO RELATED APPLICATION

This application is the national phase entry of International Application No. PCT/KR2018/011038, filed on Sep. 19, 2018, which is based upon and claims priority to Korean Patent Applications 10-2017-0126051, filed on Sep. 28, 2017, the entire contents of which are incorporated herein by reference.

TECHNICAL FIELD

The present invention relates to a transportation data logging device and an item transportation system including the same, and more particularly, to a transportation data logging device for storing and checking various pieces of information generated in an item transportation process and an item transportation system including the same.

BACKGROUND

In general, a delivery service collectively refers to a service for receiving freight, such as a postal matter, a baggage, or a product, from a sender and then rapidly delivering the freight to a receiver.

Such a delivery service demands rapid and accurate delivery, and thus there is an increasing demand for tracking and checking a delivery process among receivers and merchandise sellers.

As one of the solutions, a delivery service system for locating a delivery item is used through smart phones. In other words, a receiver and a merchandise seller can conveniently check a current location of a delivery item through an application of a smart phone.

Such a delivery service system provides a real-time freight tracking system through the Internet, thereby notifying receivers or senders of the locations of delivery items.

However, the conventional delivery service system only makes it possible to check location information through the Internet on the basis of delivery states input in each of delivery stages, and it is not possible to check information on the state of an item related to a delivery process.

In other words, it is not possible to check information, such as whether a box containing the item was opened or whether an impact occurred to the box in a delivery process. Accordingly, if there is a problem in the item after a receiver receives the item, a conflict of responsibility frequently occurs.

SUMMARY OF THE INVENTION

The present invention is directed to providing a transportation data logging device capable of storing various pieces of information which may be generated in association with an item in a transportation process so that a receiver may easily check a transportation environment of the item and an item transportation system including the transportation data logging device.

One aspect of the present invention provides a transportation data logging device attached to an internal surface of an accommodation body, in which an item is accommodated, including: a sensing unit configured to sense at least one of internal state information of the accommodation body and external event information of the accommodation body; a memory unit configured to store information acquired through the sensing unit; a communication unit configured to transmit the information stored in the memory unit to an external electronic device; a control unit configured to control operation of the sensing unit, the memory unit, and the communication unit; and a power supply unit configured to supply power to the control unit.

The sensing unit may include at least one type of sensor among an illumination sensor, a temperature sensor, a humidity sensor, a gas sensor, an acceleration sensor, and an impact sensor. Preferably, the sensing unit may include two or more types of sensors and sense both the internal state information of the accommodation body and the external event information of the accommodation body.

The communication unit may be a near field communication (NFC) antenna module.

The external event information may include at least one of information about whether the accommodation body has been opened and information about whether an external impact has occurred on the accommodation body.

The sensing unit may sense a state of the accommodation body at first periods of predetermined time intervals. In this case, the sensing unit may additionally sense the state of the accommodation body at second periods of time intervals which are shorter than the first periods when an external event occurs to the accommodation body.

The power supply unit may be a plate-shaped flexible battery. For example, the flexible battery may have a pouch shape or may be a paper battery.

Another aspect of the present invention provides an item transportation system including a housing-shaped accommodation body having an internal space for accommodating an item, and the above-described transportation data logging device attached on an internal surface of the accommodation body.

The accommodation body may include a notification unit configured to show a contact position of an electronic device, and the notification unit may be formed on an external surface of the accommodation body corresponding to the internal surface of the accommodation body to which the transportation data logging device is attached.

The notification unit may be a print mark directly printed on the external surface of the accommodation body or a sticker separately attached to the external surface.

According to the present invention, since various pieces of information which may be generated in association with an item in a transportation process are stored so that a receiver may easily check a transportation environment of the item, it is possible to improve the safety and security of the item.

DETAILED DESCRIPTION OF THE INVENTION

Figure 1:
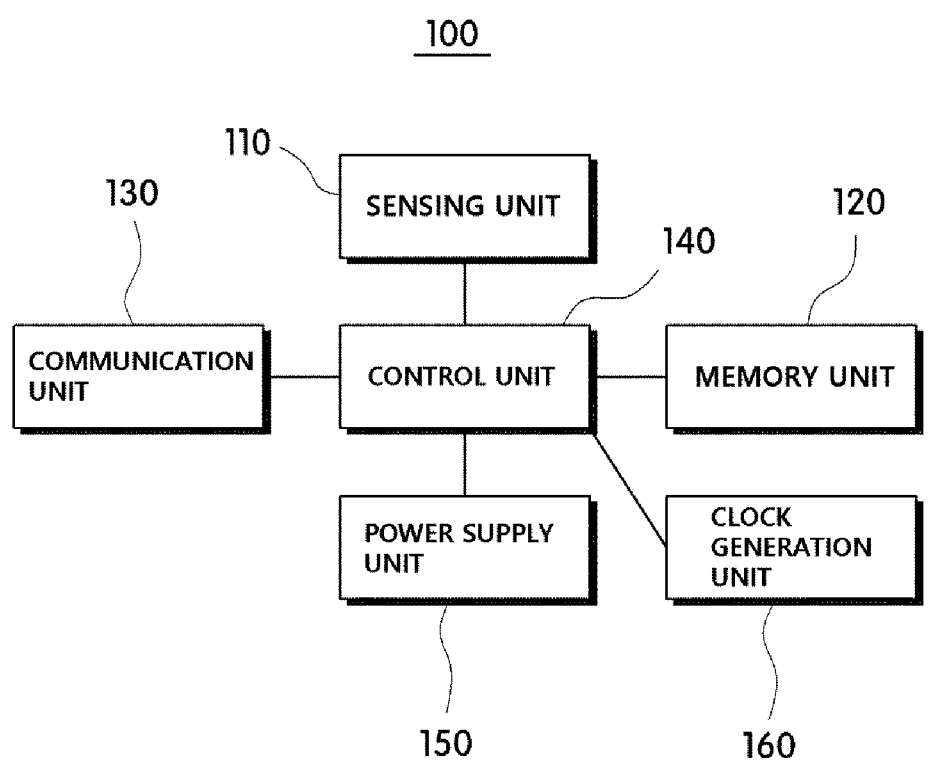
FIG. 1 is a block diagram showing a transportation data logging device according to one embodiment of the present invention.

Hereinafter, embodiments of the present invention will be described in detail with reference to the accompanying drawings so that those of ordinary skill in the technical field to which the present invention pertains can readily implement the present invention. The present invention can be implemented in various different forms and is not limited to embodiments set forth herein. In the drawings, parts irrelevant to descriptions are omitted to clearly describe the present invention. Throughout the specification, like reference numerals refer to like or similar elements.

As shown in FIG. 1, a transportation data logging device 100 according to one embodiment of the present invention includes a sensing unit 110, a memory unit 120, a communication unit 130, a control unit 140, and a power supply unit 150.

This transportation data logging device 100 may be implemented in the form of a patch and attached to an internal surface of an accommodation body 200 in which an item to be transported is contained. This will be described in detail below.

The sensing unit 110 may sense at least one of internal state information of the accommodation body 200 and external event information of the accommodation body 200. Preferably, the sensing unit 110 includes at least two types of sensors, thereby sensing not only an internal state of the accommodation body 200 in which the item is contained but also an external state of the accommodation body 200, such as an external force applied to the accommodation body 200 from the outside, which may occur in a transportation process.

In the present invention, the internal state information of the accommodation body 200 may be internal environment information of the accommodation body 200 varying over time, such as temperature, humidity, and whether gas is generated inside the accommodation body 200 in which the item is contained. Also, the external event information of the accommodation body 200 may be at least one of information about whether the seal of the accommodation body 200 has been broken, information about whether the inside of the accommodation body 200 has been exposed in the transportation process, and information about whether an external impact has occurred to the accommodation body 200.

Figure 2:
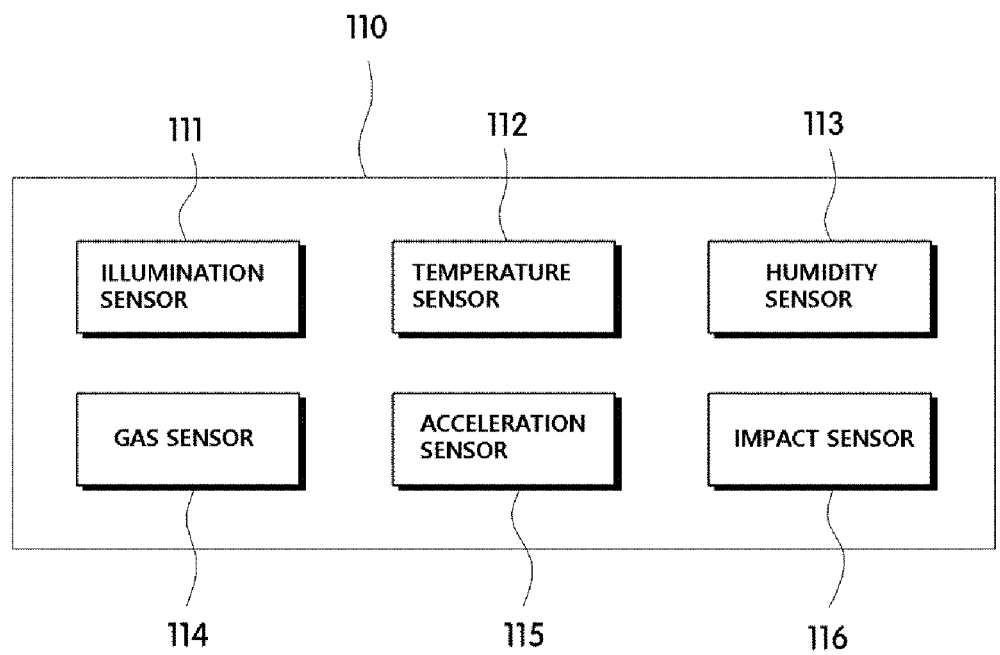
FIG. 2 is a block diagram showing a detailed configuration of a sensing unit which can be applied to the transportation data logging device according to one embodiment of the present invention.

To this end, the sensing unit 110 may include various well-known sensors mounted on a circuit board 104. As a specific example, the sensing unit 110 may include at least one type of sensor among an illumination sensor 111, a temperature sensor 112, a humidity sensor 113, a gas sensor 114, an acceleration sensor 115, and an impact sensor 116 as shown in FIG. 2. Preferably, the sensing unit 110 may include a plurality of sensors to acquire various pieces of information.

Here, the temperature sensor, the humidity sensor, and the gas sensor may acquire internal state information of the accommodation body 200 varying over time, such as temperature, humidity, and the amount of gas in the accommodation body 200, and the illumination sensor, the impact sensor, and the acceleration sensor may acquire external event information of the accommodation body 200.

As an example, the illumination sensor may determine whether light enters the accommodation body 200 by sensing internal illuminance of the accommodation body 200 in which the item is contained. Also, the impact sensor may determine whether an impact has occurred on the accommodation body 200 by sensing an external force applied from the outside. In addition, the acceleration sensor may calculate the magnitude of an external impact exerted on the accommodation body 200 by sensing movement of the item contained in the accommodation body 200.

Accordingly, a receiver may find out whether the seal of the accommodation body 200 has been broken on the basis of information acquired through the illumination sensor and check whether an external impact has occurred on the accommodation body 200 in which the item is contained during the transportation process and the intensity of the external impact on the basis of information acquired through the impact sensor and the acceleration sensor.

However, roles of the sensors are not limited thereto, and sensors which can be used to acquire internal state information of the accommodation body 200 may also be used to acquire not only the internal state information of the accommodation body 200 but also external event information of the accommodation body 200.

As an example, the temperature sensor or the humidity sensor may generate information for calculating a variation of internal temperature or internal humidity of the accommodation body 200 so that information about whether the inside of the accommodation body 200 has been exposed may be acquired on the basis of the temperature or humidity variation. Also, various well-known sensors other than the above-described sensors may be applied to the sensing unit 110 as long as it is possible to sense a state of the item contained in the accommodation body 200.

Overall operation of this sensing unit 110 may be controlled by the control unit 140, and the control unit 140 may be operated with power provided through the power supply unit 150.

In this case, information acquired through the sensing unit 110 may be stored in the memory unit 120. Also, power supply from the power supply unit 150 to the control unit 140 may be turned on or off when a physical switch 102 electrically connected to the control unit 140 is manipulated by a user.

Meanwhile, the sensing unit 110 may periodically sense a state of the accommodation body 200 at predetermined time intervals and additionally sense the state when an event, such as an external impact or breakage of the seal, occurs due to an external factor.

As an example, the sensing unit 110 may periodically sense the state of the accommodation body 200 at first periods of predetermined time intervals, and state information sensed by the sensing unit 110 may be stored in the memory unit 120.

In this situation, in a case in which an external event occurs on the accommodation body 200, the sensing unit 110 may additionally sense the state of the accommodation body 200 at second periods of time intervals different from the time intervals of the first periods, and additionally sensed external event information may be stored in the memory unit 120. Here, the second periods may be shorter time intervals than the first time periods.

As a specific example, the sensing unit 110 may sense internal state information of the accommodation body 200 varying over time, such as temperature, humidity, and the amount of gas inside the accommodation body 200, through the temperature sensor, the humidity sensor, the gas sensor, etc. every hour, and the sensed internal state information of the accommodation body 200 may be stored in the memory unit 120.

In this situation, when the illumination sensor senses a drastic change in the brightness of the inside of the accommodation body 200 or the impact sensor senses an external impact, the illumination sensor and the impact sensor may additionally perform sensing once or more times at time intervals of one to two minutes or ten minutes on the basis of an event occurrence time, and additionally sensed information may be stored in the memory unit 120.

In this way, the transportation data logging device 100 according to one embodiment of the present invention may perform additional sensing through the sensing unit 110 only when additional sensing is required. Consequently, while minimizing consumption of power provided by the power supply unit 150, it is possible to store internal state information or external event information of the accommodation body 200 in the memory unit 120.

To this end, the transportation data logging device 100 according to one embodiment of the present invention may include a clock generation unit 160 electrically connected to the control unit 140, and sensing periods of the sensing unit 110 may be determined on the basis of a signal generated by the clock generation unit 160. Here, information on the periods of signals generated by the clock generation unit 160 may be stored in the memory unit 120.

In this way, a user can approximately calculate the aforementioned occurrence time of an external event or a change time of the internal state of the accommodation body 200 on the basis of the periods of signals stored in the memory unit 120.

Here, the clock generation unit 160 may be a 32.768 kHz crystal. However, the clock generation unit 160 which can be used in the present invention is not limited thereto, and anything can be used without limitations as long as it is possible to generate information on sensing periods.

The communication unit 130 may transmit information stored in the memory unit 120 to an external electronic device in a wireless manner Here, the external electronic device 10 may be an electronic device in which a wireless communication module corresponding to the communication unit 130 is installed and may be a portable terminal such as a smart phone.

As a specific example, the communication unit 130 may be a near field communication (NFC) antenna module. When a portable terminal in which an NFC antenna module is installed is tagged to the transportation data logging device 100 according to one embodiment of the present invention, information stored in the memory unit 120 may be transmitted to the portable terminal through the communication unit 130.

Accordingly, after the accommodation body 200 is received, the receiver may check information stored in the memory unit 120 through the external electronic device 10. In this way, the receiver may conveniently check a state of the item in the transportation process and conveniently check information about whether the seal of the accommodation body 200 has been broken or information about whether an external impact has occurred on the accommodation body 200.

In this way, the receiver may conveniently check whether a problem, such as damage to the item or quality degradation of the item, has occurred in the transportation process when receiving the item contained in the accommodation body 200 or before using the item. In case of necessity, the receiver can rapidly take a measure. Accordingly, the receiver can check the reliability and safety of the item.

The control unit 140 may control the sensing unit 110, the memory unit 120, and the communication unit 130. In this way, the control unit 140 may control overall operation of the transportation data logging device 100 according to one embodiment of the present invention. This control unit 140 may use power provided by the power supply unit 150 as drive power.

Also, as described above, the memory unit 120 may serve as a storage medium for storing various pieces of information acquired through the sensing unit 110 and may store all of various pieces of information sensed when the transportation data logging device 100 according to one embodiment of the present invention operates.

Meanwhile, the above-described transportation data logging device 100 may be implemented in the form of a patch.

Figure 3:
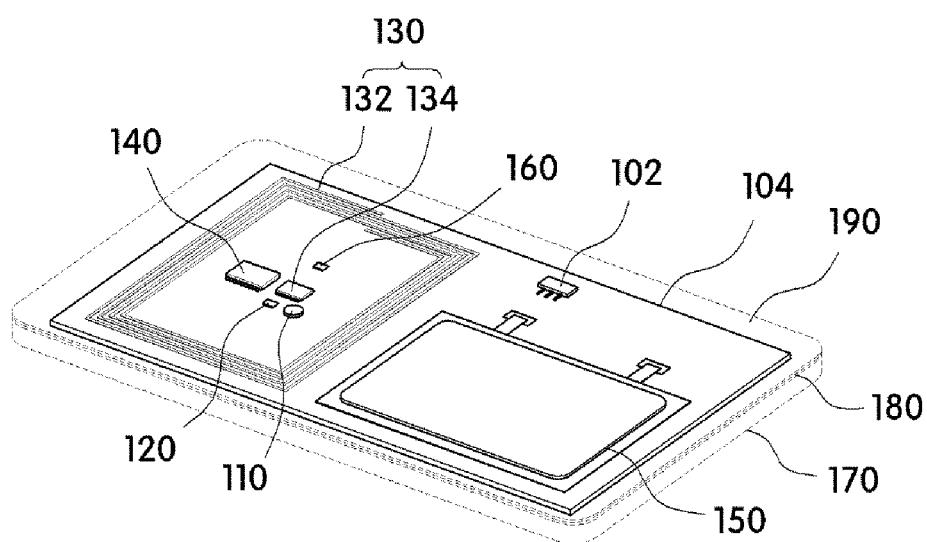
FIG. 3 is a schematic view of a transportation data logging device according to one embodiment of the present invention.

In other words, the transportation data logging device 100 may be implemented in a plate shape having a predetermined area as shown in FIG. 3, and one surface thereof may be directly attached to the inside of the accommodation body 200 by means of an adhesive member 180.

As a specific example, in the transportation data logging device 100, various circuit elements for constituting the sensing unit 110, the memory unit 120, the communication unit 130, and the control unit 140 may be mounted or patterned on the circuit board 104 having a predetermined area. Also, the power supply unit 150 may be disposed on at least one surface of the circuit board 104 and then electrically connected to the circuit board 104. In addition, a switch 102 for allowing or blocking power supply to the control unit 140 through user manipulation may be provided on a surface of the circuit board 104.

In the present invention, the circuit board 104 may be a well-known rigid circuit board, such as flame retardant 4 (FR4), or a well-known flexible circuit board (FPCB) which is made of polyimide (PI), polyethylene terephthalate (PET), or the like to have flexibility, and the circuit elements may be chipset devices which perform predetermined functions.

As a specific example, the control unit 140 may be a system semiconductor, such as a memory control unit (MCU), and the memory unit 120 may be a memory semiconductor, such as a non-volatile memory (NVM). In addition, the communication unit 130 may include an antenna pattern 132 which is formed on at least one surface of the circuit board 104 and a driver chip 134 which is mounted on the circuit board 104.

In this case, the power supply unit 150 may be a well-known coin battery or angular battery or may be a plate-shaped flexible battery for having a large power capacity while reducing the overall weight and volume. As an example, the power supply unit 150 may be a well-known paper battery or battery in a pouch shape.

In other words, since the power supply unit 150 is implemented as a plate-shape flexible battery in the transportation data logging device 100 according to one embodiment of the present invention, the overall weight may be reduced while sufficient power capacity for operation is ensured, and the transportation data logging device 100 may be reduced in thickness.

Meanwhile, the transportation data logging device 100 according to one embodiment of the present invention may include a protection member 170 for preventing a circuit pattern and circuit elements mounted on the circuit board or the power supply unit 150 104 from being exposed externally.

This protection member 170 may be a fluoropolymer resin, such as PET, polypropylene (PP), and polyethylene (PE), a sheet, such as a release paper, or a molding material covered by a resin material, such as silicon or polyurethane.

Meanwhile, the adhesive member 180 may be included on a surface of the protection member 170. Accordingly, the transportation data logging device 100 according to one embodiment of the present invention may be directly attached to an attachment surface of the accommodation body 200 through the adhesive member 180.

Here, the adhesive member 180 may be a baseless type, such as a removable adhesive or an adhesive, or a base type in which the removable adhesive or adhesive is applied to both surfaces of a base, such as double-sided tape.

In this case, a release film 190 may be attached to a surface of the adhesive member 180 to prevent the adhesive member 180 from being exposed externally when not in use. This release film 190 may be separated from the adhesive member 180 when the transportation data logging device 100 according to one embodiment of the present invention is used. In this way, the transportation data logging device 100 may be conveniently attached to the attachment surface (e.g., an internal surface of the accommodation body 200) by means of the adhesive member 180.

Figure 4:
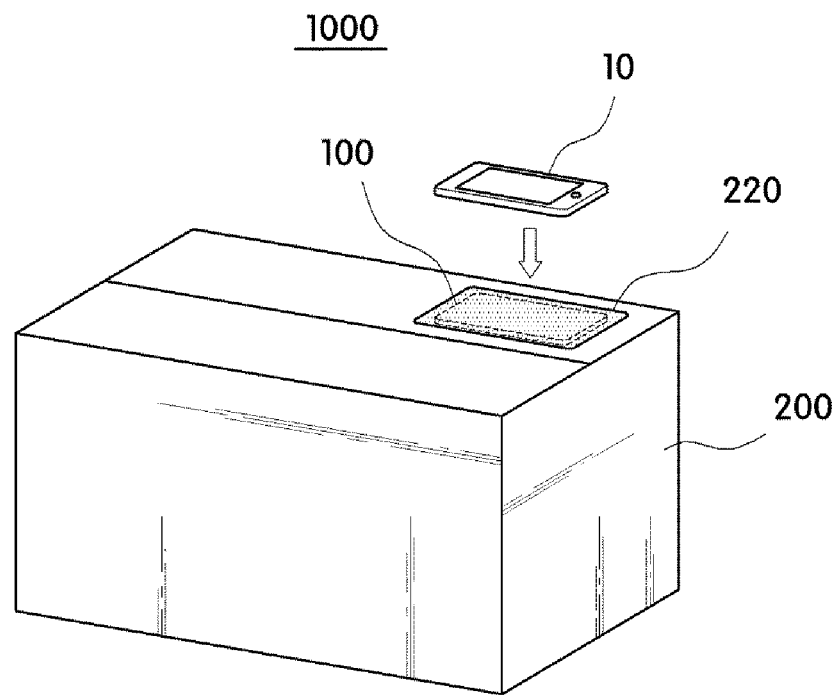
FIG. 4 is a schematic view of an item transportation system according to one embodiment of the present invention.
Figure 5:
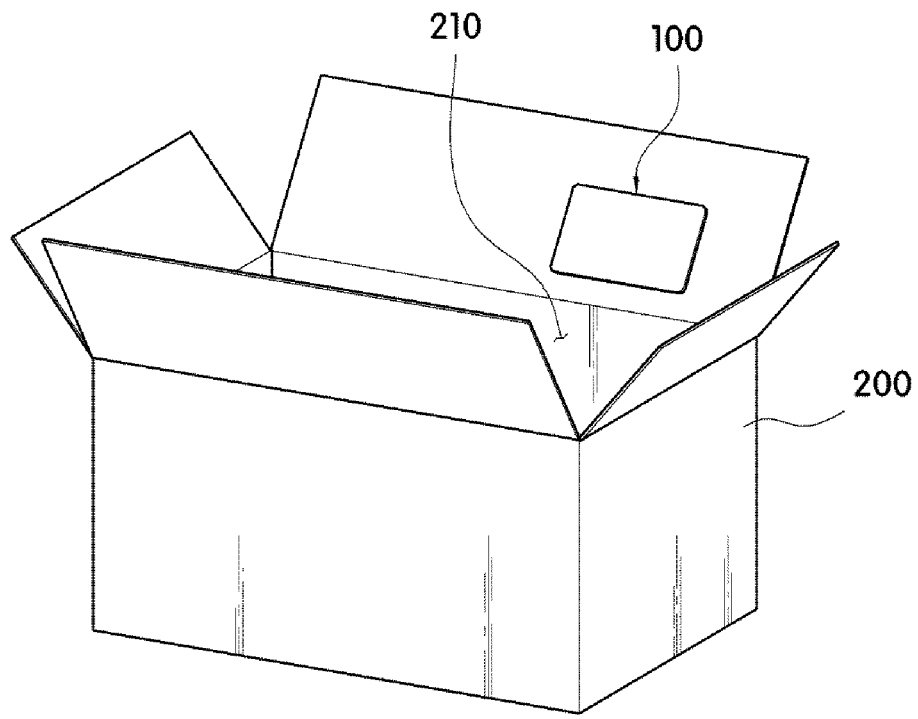
FIG. 5 is a view showing a transportation data logging device attached to an internal surface of an accommodation body of FIG. 4.

Meanwhile, an item transportation system 1000 may be implemented with the above-described transportation data logging device 100. In other words, the item transportation system 1000 according to one embodiment of the present invention may include a accommodation body 200 and a transportation data logging device 100 as shown in FIGS. 4 and 5.

Here, the accommodation body 200 may be in a housing shape having an internal space 210 for accommodating an item to be transported. As an example, the accommodation body 200 may be a box. However, the accommodation body 200 is not limited thereto, and it is possible to use anything that can accommodate and contain the item and be sealed up.

In this case, the above-described transportation data logging device 100 may be applied as the transportation data logging device 100 and the transportation data logging device 100 may be directly attached to an internal surface of the accommodation body 200 by means of the adhesive member 180.

Accordingly, the transportation data logging device 100 may sense internal state information and external event information of the accommodation body 200 generated or varying in the transportation process through the above-described sensing unit 110 and then store the internal state information and the external event information in the memory unit 120. In this case, the internal space 210 of the accommodation body 200 may contain the item to be transported, and the transportation data logging device 100 may be a state which has been operated through manipulation of the switch 102 in a state in which is attached to an internal surface of the accommodation body 200. Also, the accommodation body 200 may be a state which has been sealed up.

Meanwhile, the accommodation body 200 may include a notification unit 220 for showing a contact position of the electronic device 10 on an external surface corresponding to the internal surface to which the transportation data logging device 100 is attached. As an example, the notification unit 220 may be a print mark directly printed on the external surface of the accommodation body 200 or a sticker separately attached to the external surface. Accordingly, the receiver may easily identify an attachment position of the transportation data logging device 100 which has been attached to the internal surface of the accommodation body 200 through the notification unit 220 in the outside.

Accordingly, after transportation of the item is finished, the receiver may check various pieces of information sensed in the transportation process of the item by simply moving the electronic device 10 in which a communication module corresponding to the communication unit 130 is installed close to the notification unit 220 without opening the seal of the accommodation body 200 as shown in FIG. 4.

In addition, even when the item is damaged after the seal of the accommodation body 200 is taken off, it is possible to check various piece of information sensed in the transportation process of the item by moving the electronic device 10 close to the transportation data logging device 100. In this way, the receiver can conveniently check or track how the item has been damaged.

Although one embodiment of the present invention has been described above, the spirit of the present invention is not limited to the embodiment set forth herein. Those of ordinary skill in the art can easily propose other embodiments through supplement, alteration, removal, addition, etc. of elements within the spirit and scope of the present invention, and those should be construed as falling within the scope of the present invention.

The invention claimed is:

1. An item transportation system comprising:
   a housing-shaped accommodation body having an internal space for accommodating an item; and
   a plate-shaped transportation data logging device attached on an internal surface of the accommodation body by an adhesive member, the plate-shaped transportation data logging device comprising a sensing unit, a memory unit, a communication unit, a control unit, and a power supply unit;
   wherein the sensing unit comprises at least one illumination sensor for sensing light entering in the accommodation body, and/or at least one impact sensor for sensing an external force applied from outside of the accommodation body;
   wherein the transportation data logging device is configured to:
   sense, using the sensing unit, an internal state information of the accommodation body or an external event information of the accommodation body, wherein the sensing unit senses a state of the accommodation body at first periods of predetermined time intervals and senses the state at second periods of time intervals which are shorter than the first periods when an external event occurs to the accommodation body;
   store, using the memory unit, the internal state information or the external event information acquired through the sensing unit;
   transmit, using the communication unit, the internal state information or the external event information stored in the memory unit to an external electronic device;
   control, using the control unit, operation of the sensing unit, the memory unit, and the communication unit; and
   supply, using the power supply unit, power to the control unit,
   wherein the accommodation body comprises a notification unit showing a contact position of the external electronic device, the notification unit is formed on an external surface of the accommodation body so that an attachment position of the transportation data logging device attached on the internal surface of the accommodation body which is identified on the outside of the accommodation body without opening a seal of the accommodation body, and the notification unit is located at a position corresponding to the attachment position of the transportation data logging device;

wherein the notification unit is a print mark directly printed on the external surface of the accommodation body or a sticker with a print mark separately attached to the external surface of the accommodation body, wherein the external electronic device receives the internal state information of the accommodation body or the external event information of the accommodation body stored in the memory unit through the communication unit without opening a seal of the accommodation body.

2. The item transportation system of claim 1, wherein the sensing unit further comprises at least one of a temperature sensor, a humidity sensor, a gas sensor, and an acceleration sensor.

3. The item transportation system of claim 1, wherein the communication unit is a near field communication (NFC) antenna module.

4. The item transportation system of claim 1, wherein the external event information includes at least one of information about whether the accommodation body has been opened and information about whether an external impact has occurred on the accommodation body.

5. The item transportation system of claim 1, wherein the power supply unit is a plate-shaped flexible battery.

* * * * *